US009903736B2

(12) United States Patent
Azulay et al.

(10) Patent No.: US 9,903,736 B2
(45) Date of Patent: Feb. 27, 2018

(54) UTILITY METER HAVING A METER REGISTER UTILIZING A MULTIPLE RESONANCE ANTENNA

(71) Applicant: Arad Measuring Technologies Ltd., Yokneam Elit (IL)

(72) Inventors: Snir Azulay, Tiberius (IL); Yosi Twina, Roash-Hain (IL); Yonatan Kemelman, Kfar Saba (IL); Manny Greenberg, Givat-Elah (IL)

(73) Assignee: Arad Measuring Technologies Ltd., Yokneam Elit (IL)

( * ) Notice: Subject to any disclaimer, the term of this patent is extended or adjusted under 35 U.S.C. 154(b) by 0 days.

(21) Appl. No.: 14/856,684

(22) Filed: Sep. 17, 2015

(65) Prior Publication Data

US 2016/0187157 A1 Jun. 30, 2016

Related U.S. Application Data

(60) Provisional application No. 62/052,133, filed on Sep. 18, 2014.

(51) Int. Cl.
*G01D 4/00* (2006.01)
*H04Q 9/00* (2006.01)
(Continued)

(52) U.S. Cl.
CPC ........... *G01D 4/002* (2013.01); *G01F 15/063* (2013.01); *G01F 15/14* (2013.01); *H04Q 9/00* (2013.01);
(Continued)

(58) Field of Classification Search
CPC ... G01F 1/58; G01F 1/74; G01F 22/00; G01F 25/0092; G01F 15/063; G01F 15/007;
(Continued)

(56) References Cited

U.S. PATENT DOCUMENTS

| 4,070,676 A | 1/1978 | Sanford |
| 5,111,407 A | 5/1992 | Galpern |

(Continued)

FOREIGN PATENT DOCUMENTS

| JP | 2007221756 A | 8/2007 |
| WO | 2005091433 A1 | 9/2005 |

(Continued)

OTHER PUBLICATIONS

Gianesello, "Innovate in a 4G world: RFIC Designers Discovering Antennas," 7th European Conference on Antennas and Propagation, IL2.1, Apr. 9, 2013, Gothenburg.

*Primary Examiner* — Mirza Alam
(74) *Attorney, Agent, or Firm* — The Webb Law Firm

(57) ABSTRACT

A utility meter includes: a meter body having a chamber through which material passes; a measuring unit contained within the chamber; and a register attached to the chamber. The register includes a register body and an electronics unit operatively connected to the measuring unit and positioned within the register body. The electronics unit coacts with the measuring unit to determine at least one of a volume of flow and a flow rate of a fluid traveling through the chamber. The register also includes a multiple resonance antenna operatively connected to the electronics unit and positioned within the register. The multiple resonance antenna is configured to resonate at at least a first frequency band and a second frequency band such that a signal representing at least one of the volume of flow and the flow rate is transmitted to a remote unit within the first frequency band when the utility meter is surrounded by a first medium and the signal representing at least one of the volume of flow and the flow rate is transmitted to the remote unit within the second frequency band when the utility meter is surrounded by a second medium.

27 Claims, 7 Drawing Sheets

(51) Int. Cl.
*G01F 15/06* (2006.01)
*G01F 15/14* (2006.01)

(52) U.S. Cl.
CPC ..... *H04Q 2209/40* (2013.01); *H04Q 2209/84* (2013.01)

(58) Field of Classification Search
CPC ...... A61M 2205/3334; A61M 5/16886; G01D 4/002; G01D 4/006; H04Q 2209/84; H04Q 9/00
See application file for complete search history.

(56) References Cited

U.S. PATENT DOCUMENTS

| | | | |
|---|---|---|---|
| 5,298,894 | A | 3/1994 | Cerny et al. |
| 5,644,319 | A | 7/1997 | Chen et al. |
| 5,825,303 | A | 10/1998 | Bloss, Jr. et al. |
| 5,837,902 | A * | 11/1998 | Veneruso ............... G01F 1/64 73/861.06 |
| 5,926,139 | A | 7/1999 | Korisch |
| 6,177,883 | B1 | 1/2001 | Jennetti et al. |
| 6,218,995 | B1 | 4/2001 | Higgins et al. |
| 6,300,907 | B1 | 10/2001 | Lazar et al. |
| 6,337,667 | B1 | 1/2002 | Ayala et al. |
| 6,369,769 | B1 | 4/2002 | Nap et al. |
| 6,414,605 | B1 | 7/2002 | Walden et al. |
| 6,515,627 | B2 | 2/2003 | Lopez et al. |
| 6,573,869 | B2 | 6/2003 | Moore |
| 6,606,070 | B2 | 8/2003 | Olson et al. |
| 6,617,976 | B2 | 9/2003 | Walden et al. |
| 6,697,023 | B1 | 2/2004 | Tiao-Hsing et al. |
| 6,734,826 | B1 | 5/2004 | Dai et al. |
| 6,738,023 | B2 | 5/2004 | Scott et al. |
| 6,819,292 | B2 | 11/2004 | Winter |
| 6,836,246 | B1 | 12/2004 | Kadambi et al. |
| 6,864,841 | B2 | 3/2005 | Dai et al. |
| 6,894,647 | B2 | 5/2005 | Jenwatanavet |
| 6,897,810 | B2 | 5/2005 | Dai et al. |
| 6,943,733 | B2 | 9/2005 | Vance |
| 6,954,144 | B1 | 10/2005 | Kiser et al. |
| 6,980,154 | B2 | 12/2005 | Vance et al. |
| 7,023,388 | B2 | 4/2006 | Shimabara |
| 7,099,690 | B2 | 8/2006 | Milosavljevic |
| 7,109,924 | B2 | 9/2006 | Vance |
| 7,324,054 | B2 | 1/2008 | Ozkar |
| 7,365,687 | B2 | 4/2008 | Borleske et al. |
| 7,391,375 | B1 | 6/2008 | Lin et al. |
| 7,477,195 | B2 | 1/2009 | Vance |
| 7,477,198 | B2 | 1/2009 | Kanazawa et al. |
| 7,510,422 | B2 | 3/2009 | Showcatally et al. |
| 7,589,678 | B2 | 9/2009 | Perunka et al. |
| 7,663,555 | B2 | 2/2010 | Caimi et al. |
| 7,683,839 | B2 | 3/2010 | Ollikainen et al. |
| 7,688,277 | B2 | 3/2010 | Brocheton et al. |
| 7,705,788 | B2 | 4/2010 | Hung et al. |
| 7,711,322 | B2 | 5/2010 | Rhodes et al. |
| 7,742,006 | B2 | 6/2010 | Villarroel et al. |
| 7,746,246 | B2 | 6/2010 | Salser, Jr. |
| 7,808,440 | B2 | 10/2010 | Iizuka et al. |
| 7,834,813 | B2 | 11/2010 | Caimi et al. |
| 7,834,814 | B2 | 11/2010 | Xie et al. |
| 7,873,316 | B2 | 1/2011 | Rhodes et al. |
| 7,916,093 | B2 | 3/2011 | Chiang et al. |
| 7,978,141 | B2 | 7/2011 | Chi et al. |
| 7,986,281 | B2 | 7/2011 | Hsiao et al. |
| 7,990,321 | B2 | 8/2011 | Shih |
| 8,000,737 | B2 | 8/2011 | Caimi et al. |
| 8,045,919 | B2 | 10/2011 | Rhodes et al. |
| 8,109,131 | B2 | 2/2012 | Winter |
| 8,223,083 | B2 | 7/2012 | Wong et al. |
| 8,264,415 | B2 | 9/2012 | Winkler et al. |
| 8,315,560 | B2 | 11/2012 | Rhodes et al. |
| 8,319,691 | B2 | 11/2012 | Tsai et al. |
| 8,326,219 | B2 | 12/2012 | Rhodes et al. |
| 8,330,669 | B2 | 12/2012 | Cornwall et al. |
| 8,331,856 | B2 | 12/2012 | Rhodes et al. |
| 8,350,761 | B2 | 1/2013 | Hill et al. |
| 8,456,366 | B2 | 6/2013 | Vance |
| 8,514,132 | B2 | 8/2013 | Rao |
| 8,515,343 | B2 | 8/2013 | Rhodes et al. |
| 8,577,289 | B2 | 11/2013 | Schlub et al. |
| 8,587,484 | B2 | 11/2013 | Peng et al. |
| 8,681,051 | B2 | 3/2014 | Huang et al. |
| 8,698,673 | B2 | 4/2014 | Wong et al. |
| 8,723,733 | B2 | 5/2014 | Tran et al. |
| 8,723,750 | B2 | 5/2014 | Podduturi |
| 8,749,438 | B2 | 6/2014 | Jenwatanavet et al. |
| 8,810,467 | B2 | 8/2014 | Lee et al. |
| 2002/0124661 | A1 | 9/2002 | Wagner |
| 2004/0085248 | A1 | 5/2004 | Onaka et al. |
| 2007/0124091 | A1 * | 5/2007 | Wee ............... G01F 1/58 702/49 |
| 2007/0159399 | A1 | 7/2007 | Perunka et al. |
| 2007/0188392 | A1 | 8/2007 | Kanazawa et al. |
| 2009/0174604 | A1 | 7/2009 | Keskitalo et al. |
| 2010/0026515 | A1 * | 2/2010 | Lazar ............... G01D 4/002 340/870.02 |
| 2011/0063172 | A1 | 3/2011 | Podduturi |
| 2011/0064151 | A1 | 3/2011 | Rhodes et al. |
| 2011/0074641 | A1 | 3/2011 | Sotoma et al. |
| 2011/0163937 | A1 | 7/2011 | Jung et al. |
| 2011/0260925 | A1 | 10/2011 | Chirila |
| 2011/0301877 | A1 * | 12/2011 | Wee ............... G01F 1/363 702/47 |
| 2012/0032862 | A1 | 2/2012 | Ying |
| 2012/0105246 | A1 | 5/2012 | Sexton et al. |
| 2012/0191380 | A1 | 7/2012 | Winter |
| 2013/0154894 | A1 | 6/2013 | Caimi et al. |
| 2013/0249764 | A1 | 9/2013 | Amaya et al. |
| 2013/0293389 | A1 * | 11/2013 | Sinsuan ............... H04B 1/7103 340/870.02 |
| 2013/0301683 | A1 | 11/2013 | Sinsuan et al. |
| 2013/0328696 | A1 * | 12/2013 | Drachmann ............ G01D 4/002 340/870.02 |
| 2014/0002308 | A1 | 1/2014 | Chen et al. |
| 2014/0015719 | A1 | 1/2014 | Ramachandran |
| 2014/0104115 | A1 | 4/2014 | Huang et al. |
| 2014/0125526 | A1 | 5/2014 | Hong et al. |
| 2014/0159719 | A1 | 6/2014 | Chon |
| 2014/0159971 | A1 | 6/2014 | Hall et al. |
| 2014/0159982 | A1 | 6/2014 | De Luis et al. |
| 2014/0162734 | A1 | 6/2014 | Shewan et al. |
| 2016/0055649 | A1 * | 2/2016 | Peret ............... G01F 1/661 348/135 |

FOREIGN PATENT DOCUMENTS

| | | | | |
|---|---|---|---|---|
| WO | WO 2005091433 A1 * | 9/2005 | ............... | H01Q 1/22 |
| WO | 2008045151 A1 | 4/2008 | | |
| WO | 2010014504 A1 | 2/2010 | | |

* cited by examiner

UTILITY METER HAVING A METER REGISTER UTILIZING A MULTIPLE RESONANCE ANTENNA

CROSS REFERENCE TO RELATED APPLICATIONS

This application claims the benefit of United States Provisional Patent Application Ser. No. 62/052,133 entitled "Utility Meter Having a Meter Register Utilizing a Multiple Resonance Antenna" filed Sep. 18, 2014, which is incorporated herein by reference.

BACKGROUND OF THE INVENTION

Field of the Invention

The present invention relates to meter registers and, more particularly, to meter registers for remote reading that includes a multiple resonance antenna.

Description of Related Art

Presently, many locales visually read utility meters to determine utility consumption. The meters, such as water meters, include an odometer that identifies the consumption of the water consumed. The odometer is read periodically and the difference between the present and the prior reading determines the amount of utility water used. For example, if the most recent water meter reading was 2 million gallons or liters and the previous water meter reading was 1.8 million gallons or liters, then 200,000 gallons or liters of water were consumed. This procedure of individually reading water meters is time consuming, labor intensive, and expensive. In a competitive market, such an expense affects profitability to the utility provider. This is especially a problem in submetering markets where a separate entity may have to be employed to read water meters in apartment buildings and apartment building complexes.

Accordingly, systems were developed relating to remote reading systems. One such system is described in U.S. Pat. No. 5,111,407 to Galpern and entitled "System for Measuring and Recording a Utility Consumption". This particular arrangement incorporated a transponder and receiver arrangement whereby a meter reader placed a meter reading device in close proximity to a transponder for a meter reading. This arrangement reduced the time spent by the meter reader on an individual site and more accurately recorded utility consumption. However, meter reading was still a labor intensive process.

Subsequently, meter reading systems have evolved whereby they are either connected to telephone lines and/or transmitters which transmit radio waves to a central location. In many instances, this eliminates many of the problems associated with utility consumption reading. For example, Automatic Meter Reading (AMR) systems have been developed based on wireless networks. Such AMR systems typically include an end unit (EU) and a Collector Unit (CU). The EU measures the water flow and water consumption at the entrance point of houses, offices, or any civilian or industrial construction with a water connection. The EU accurately measures the water flow in a pipe and transmits the measured data to the CU using a radio frequency transmitter. Examples of such AMR systems can be found in United States Patent Application Publication No. 2012/0191380 and U.S. Pat. Nos. 8,109,131 and 6,819,292, which are hereby incorporated by reference.

There are many types of EU installations. For instance, the EU can be positioned within the basement of a house or outside of a house mounted on a pipe. In addition, in moderate climate zones, the EU is located in a subsurface ground enclosure in an area near residences or other dwellings. Such enclosures are referred to as "pits". However, the positioning of a utility meter in such a pit causes various limitations when the utility meter is used as part of an AMR system. For instance, the radio wave signals of the antenna cannot radiate a great distance due to the properties of the pit. Further, in some instances, the pit may fill with water further hampering the transmission capability of the antenna.

Accordingly, a need exists for a meter register for remote reading that can provide a proper and consistent reading even when positioned in a pit and particularly when the pit is filled with water.

SUMMARY OF THE INVENTION

In accordance with an embodiment of the invention, provided is a utility meter that comprises: a meter body having a chamber through which material passes; a measuring unit contained within the chamber; and a register attached to the chamber. The register includes a register body and an electronics unit operatively connected to the measuring unit and positioned within the register body. The electronics unit coacts with the measuring unit to determine at least one of a volume of flow and a flow rate of a fluid traveling through the chamber. The register also includes a multiple resonance antenna operatively connected to the electronics unit. The multiple resonance antenna is configured to resonate at at least a first frequency band and a second frequency band such that a signal representing at least one of the volume of flow and the flow rate is transmitted to a remote unit within the first frequency band when the utility meter is surrounded by a first medium and the signal representing, for example, the volume of flow or the flow rate is transmitted to the remote unit within the second frequency band when the utility meter is surrounded by at least a second medium.

The register may further include a face cap and a space between the cap and the antenna is filled with a medium. The medium may be at least one of gas and gel. The measuring unit may be any suitable utility measuring unit such as, but not limited to, a positive-displacement type measuring unit, a vane-type measuring unit, an ultrasonic measuring unit, or a multi-jet type measuring unit. The first frequency band may be A1-A2 MHz and the second frequency band may be B1-B2 MHz, where A2>A1, B2>B1, and B1≥A2. More specifically, the first frequency band may be about 450-470 MHz and the second frequency band may be about 500-520 MHz. Alternatively, the first frequency band may be less than 1 GHz and the second frequency band may be greater than 1 GHz. The first medium may be a gas, such as air, and the second medium may be water. The utility meter may be connected to a pipe positioned within a subsurface pit enclosure.

In one embodiment, the register body may include an upper face portion and a lower portion defining an internal cavity when connected together. The electronics unit may include a visual display that may be visible through the face portion of the register body. The visual display may display at least one of the volume of flow and the flow rate of the fluid traveling through the chamber as measured by the register. The meter body and the register may be formed as a unitary structure.

The electronics unit of the register may further include a microprocessor having a transceiver operatively connected to the multiple resonance antenna. The register may be configured to transmit the signal representing at least one of the volume of flow and the flow rate periodically or non-periodically via the multiple resonance antenna, thereby identifying utility consumption.

Also provided is a meter register for use with a utility meter. The meter register includes a register body and an electronics unit operatively connected to a measuring unit of a utility meter and positioned within the register body. The electronics unit coacts with the measuring unit to determine at least one of a volume of flow and a flow rate of a fluid traveling through the utility meter. The meter register also includes a multiple resonance antenna operatively connected to the electronics unit and positioned within the register. The multiple resonance antenna is configured to resonate at at least a first frequency band and a second frequency band such that a signal representing at least one of the volume of flow and the flow rate is transmitted to a remote unit within the first frequency band when the utility meter is surrounded by a first medium and the signal representing at least one of the volume of flow and the flow rate is transmitted to the remote unit within the second frequency band when the utility meter is surrounded by a second medium.

In addition, provided is an antenna for use with a utility meter. The antenna includes a first resonance element and a second resonance element formed on a substrate. The substrate may be manufactured from a flexible material, a rigid material, or any other suitable material. The first resonance element is configured to resonate at at least a first frequency band and the second resonance element is configured to resonate at at least a second frequency band such that a signal representing at least one of the volume of flow and the flow rate is transmitted to a remote unit within the first frequency band when the utility meter is surrounded by a first medium and the signal representing at least one of the volume of flow and the flow rate is transmitted to the remote unit within the second frequency band when the utility meter is surrounded by at least a second medium. While the transmitted signal is discussed hereinabove as representing the volume of flow or flow rate this is not to be construed as limiting the present invention as the transmitted signal may represent any suitable measured fluid property, such as pressure.

Still further, provided is a utility meter that includes: a meter body having a chamber through which material passes; a measuring unit contained within the chamber; and a register attached to the chamber. The register comprises: a register body; an electronics unit operatively connected to the measuring unit and positioned within the register body; a first antenna operatively connected to the electronics unit and positioned within the register; a second antenna operatively connected to the electronics unit and positioned within the register; and a switching element operatively connected between the electronics unit and the first antenna and second antenna. The electronics unit coacts with the measuring unit to determine at least one of a volume of flow and a flow rate of a fluid traveling through the chamber. The first antenna is configured to resonate at at least a first frequency band and the second antenna is configured to resonate at at least a second frequency band such that a signal representing at least one of the volume of flow and the flow rate is transmitted to a remote unit within the first frequency band when the utility meter is surrounded by a first medium and the signal representing at least one of the volume of flow and the flow rate is transmitted to the remote unit within the second frequency band when the utility meter is surrounded by at least a second medium.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DESCRIPTION OF THE INVENTION

Figure 1:
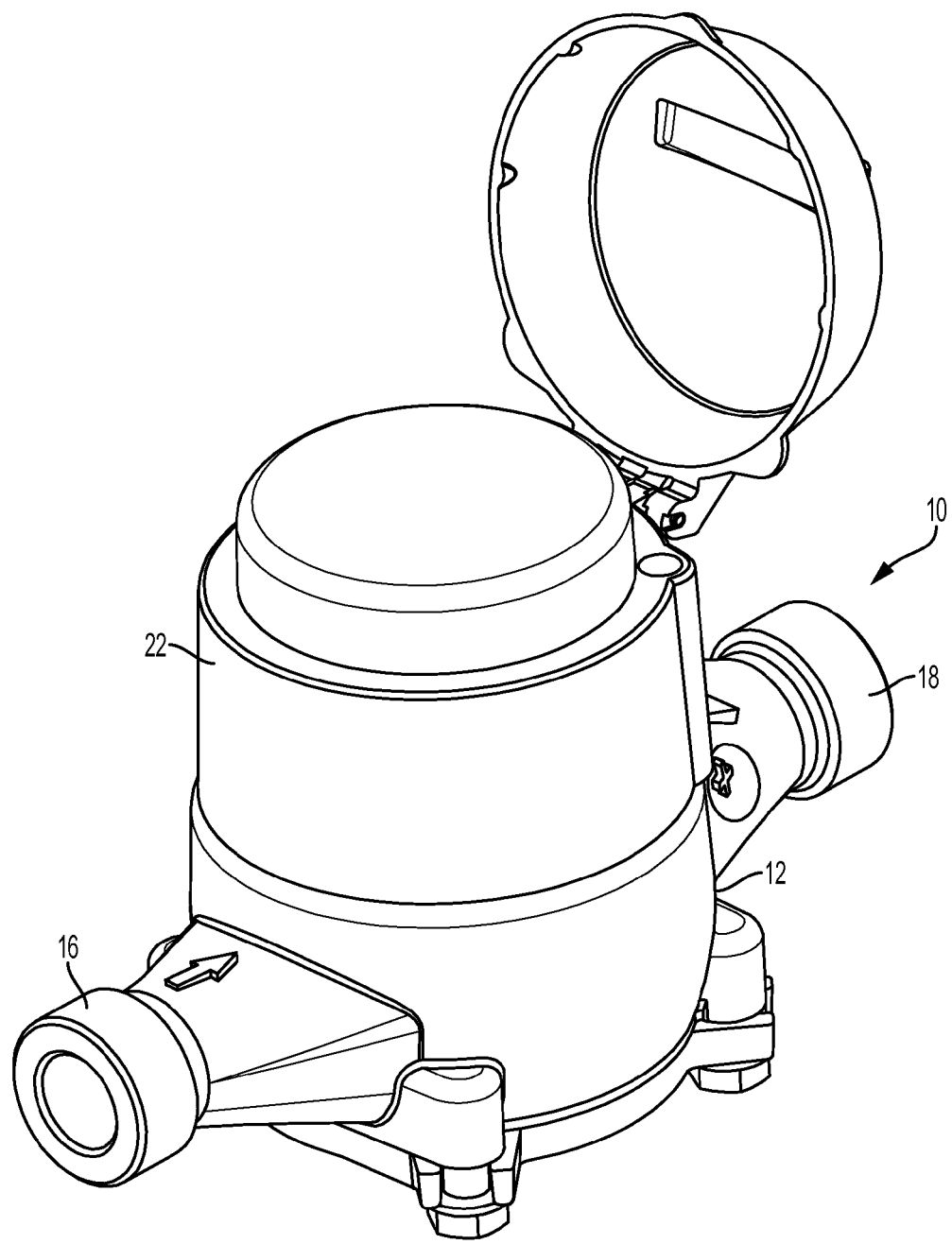
FIG. 1 is a front perspective view of a utility meter in accordance with the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
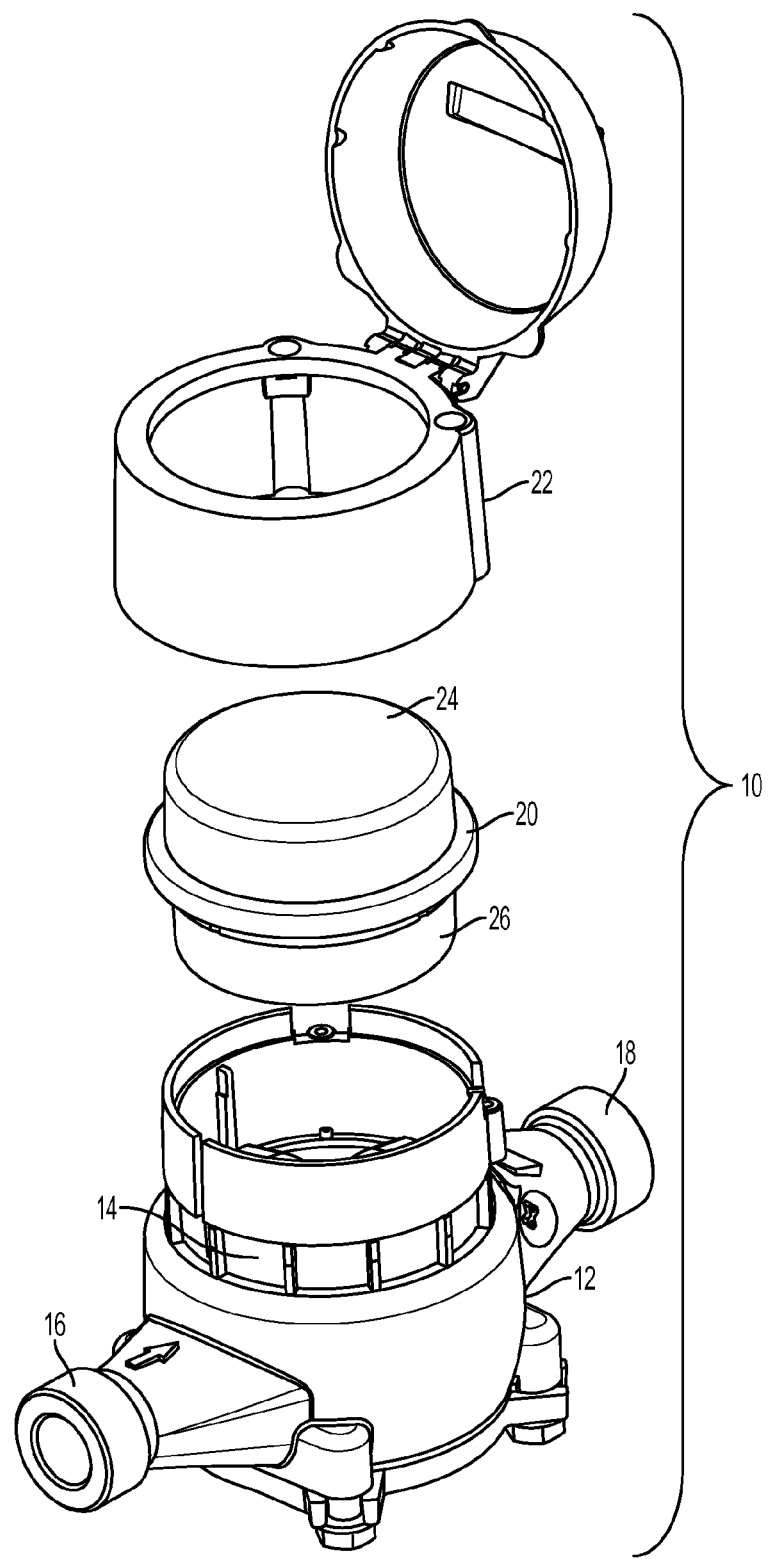
FIG. 2 is an exploded perspective view of the utility meter of FIG. 1.

With reference to FIGS. 1 and 2, a utility meter, generally denoted by reference numeral 10, includes a body 12 having a measuring chamber 14, an inlet 16, an outlet 18, a register 20, and a hinged cover member 22 connected to the body 12 and covering the register 20. Desirably, the body 12 is made of a metallic material, such as bronze, copper, or stainless steel, although it can be made of other materials, such as plastic. The measuring chamber 14 can include many different types of measuring-type chambers, such as positive displacement chambers and/or a vane or a multi-jet type chamber. The inlet 16 and outlet 18 are adapted to be secured to piping. The register 20 is a sealed register and is operatively coupled to the measuring chamber 14. The register 20 includes an arrangement to transmit and receive radio waves. The radio waves are received by a transmission/receiving arrangement at a remote location. The register 20 and body 12 may be provided as separate components or may be of a unitary construction.

Figure 3:
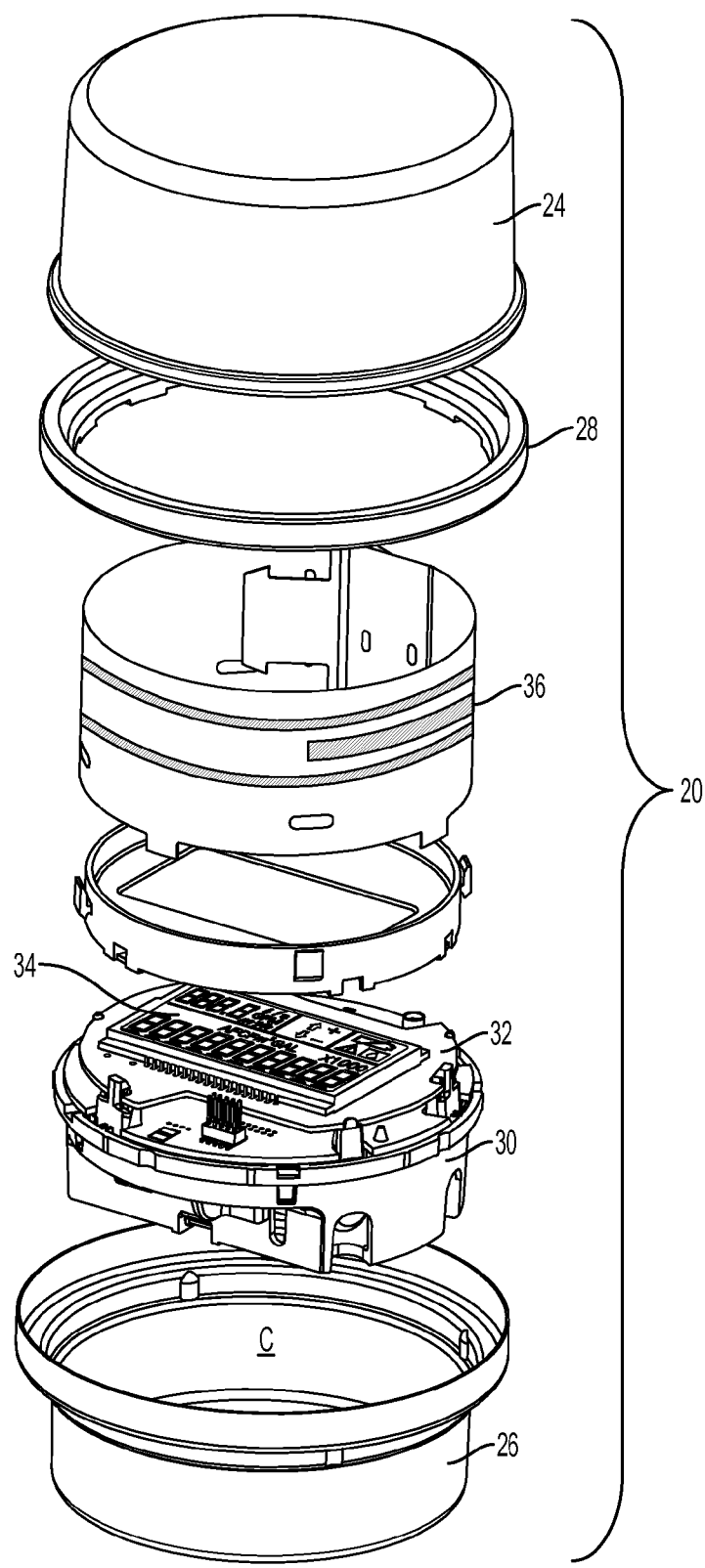
FIG. 3 is an exploded perspective view of a meter register for use with the utility meter of FIG. 1.

With reference to FIG. 3 and with continuing reference to FIGS. 1 and 2, the register 20 includes a face cap 24 attached to a metallic cup 26. Desirably, the face cap 24 is made of a glass or a clear polymeric material and is fixably secured to the metallic cup 26 which can be made of copper or stainless steel. The face cap 24 is mechanically sealed to the metallic cup 26 and includes a rubber gasket or seal 28 to secure the face cap 24 and metallic cup 26 together and be held via a friction fit. An internal cavity C is defined by the face cap 24 and the metallic cup or bottom portion 26.

An electronics unit 30 is provided within the register 20. The electronics unit 30 includes a board 32 that has a microprocessor (not shown) having a transceiver (not shown) electrically coupled to a power supply (not shown). The electronics unit 30 coacts with the measuring chamber 14 to determine at least one of a volume of flow and a flow rate of a fluid traveling through the body 12. The electronics unit 30 may further include a visual display 34 that may be visible through the face cap 24 of the register 20. The visual display 34 may display at least one of the volume of flow and the flow rate of the fluid traveling through the body 12 as measured by the register 20. The register 20 also includes an antenna 36 that is electronically coupled to the transceiver of the microprocessor for transmitting a signal indicative of at least one of a volume of flow and a flow rate of fluid traveling through the body 12 to a remote location. A gas, such as air or any other suitable gas, a vacuum, or a gel may be provided within the register to separate the antenna 36 from the face cap 24. The register 20 is configured to transmit the signal representing at least one of the volume of flow and the flow rate periodically or nonperiodically via the antenna, thereby identifying utility consumption.

Additional details of utility meter 10 may be found in United States Patent Application Publication No. 2012/0191380 and U.S. Pat. Nos. 8,109,131 and 6,819,292, which are hereby incorporated by reference in their entirety.

Figure 4:
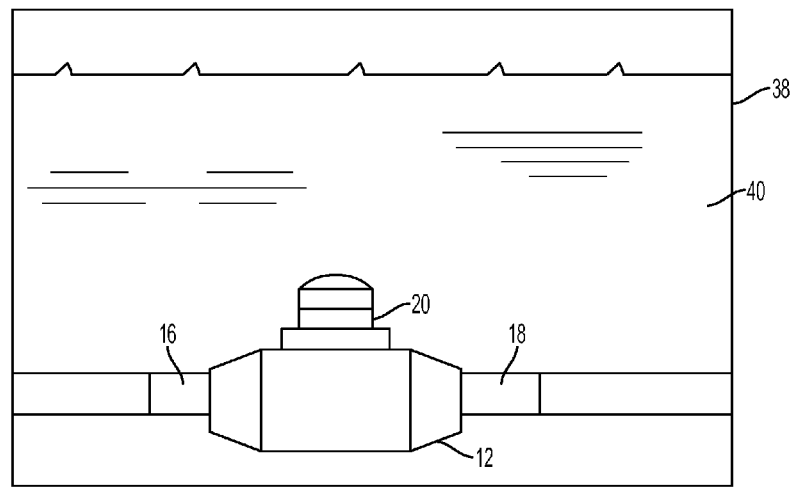
FIG. 4 shows a meter in accordance with the present invention positioned within a pit.

As discussed hereinabove, in various cases, the utility meter 10, particularly when utilized as a water meter, is contained in a pit 38, as shown in FIG. 4, positioned in the ground. In this arrangement, the radio wave signals of the antenna 36 cannot radiate a great distance due to the properties of the pit 38. Further, in some instances, the pit 38 may fill with water 40 further hampering the transmission capability of the antenna 36. In such instances, the antenna 36 may be embodied as a multiple resonance antenna.

Figure 5:
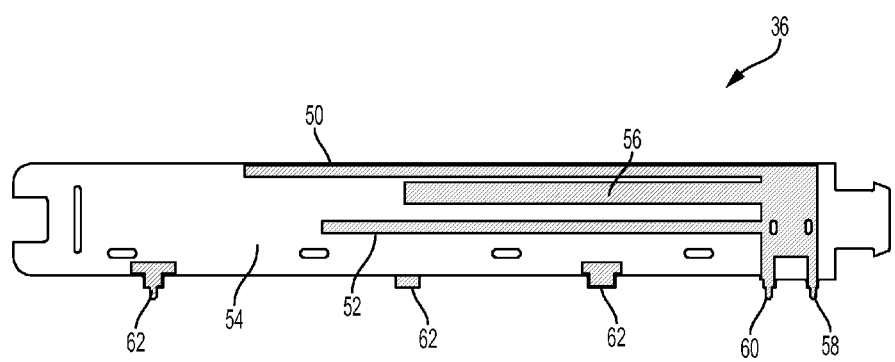
FIG. 5 is a top plan view of an exemplary multiple resonance antenna for use with the meter register of FIG. 3.

With reference to FIG. 5, an exemplary multiple resonance antenna 36 may be configured as an inverted-F antenna (IFA). More specifically, antenna 36 comprises a first resonance element 50 and a second resonance element 52 formed on a flexible substrate 54. A ground plane 56 is disposed between the first resonance element 50 and the second resonance element 52. A feed point connection 58 and a ground point connection 60 are also provided. In addition, the antenna 36 includes at least one mechanical connector 62 for mounting the antenna 36 within the register 20. However, the antenna arrangement illustrated in FIG. 5 is not to be construed as limiting the present invention as any suitable multiple resonance antenna may be utilized.

The following discusses operation of the utility meter 10. Initially, water passes through the inlet 16 causing the measuring chamber 14 to rotate, thereby providing an indication of the quantity of liquid flowing through the meter. The microprocessor is configured to determine the number of rotations of the measuring chamber 14 and the direction of rotation. In this manner, a signal can be provided to the antenna 36 indicating the number of rotations which, in turn, determines the volumetric amount of fluid passing through the meter. The signal is then transmitted through the antenna 36. The transmitted signal is then picked up by a receiver (not shown). The receiver may, for example, be a part of a remote meter reading unit. The receiver then receives various packets of information transmitted from the antenna 36.

The antenna 36 can not only transmit information signals but, likewise, can receive information signals from a transmitter of the remote meter reading unit, that is a two-way communication. Desirably, this information can be used to correctly adjust the transmitted meter information. This permits the information to be transmitted via the meter register 20 to be modified in the field without removal of the meter register 20.

The microprocessor, which is coupled to the antenna 36 via the transceiver, can also provide other information related to the operation of the meter. For example, the register 20 can monitor the flow rate through the meter and, if that information exceeds a fixed flow rate number or the flow rate does not change over a period of time, an alarm can be issued indicating that there may be a leak. Specifically if, for example, the meter 10 can detect a flow rate Q as low as 1 liter or quart per hour and over a fixed period of time t, e.g., thirty minutes, and if Q/t over a fixed period of time, e.g., one hour, remains constant, then this could indicate a leak condition. A low constant flow rate over a period of time could indicate a small leak, such as in a toilet, or a large consistent flow rate over a period of time could indicate that a main water line has failed or a bathtub is overflowing. An alarm can be issued either at the location of the meter, or via email or a telephone message, for example.

Figure 6:
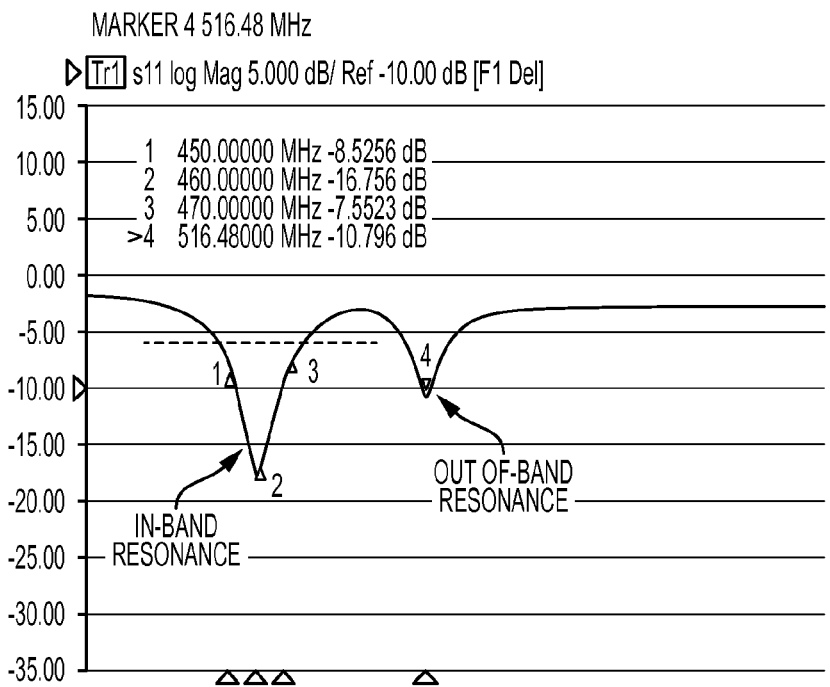
FIG. 6 is a graph illustrating the resonances of the multiple resonance antenna of FIG. 5.
Figure 7:
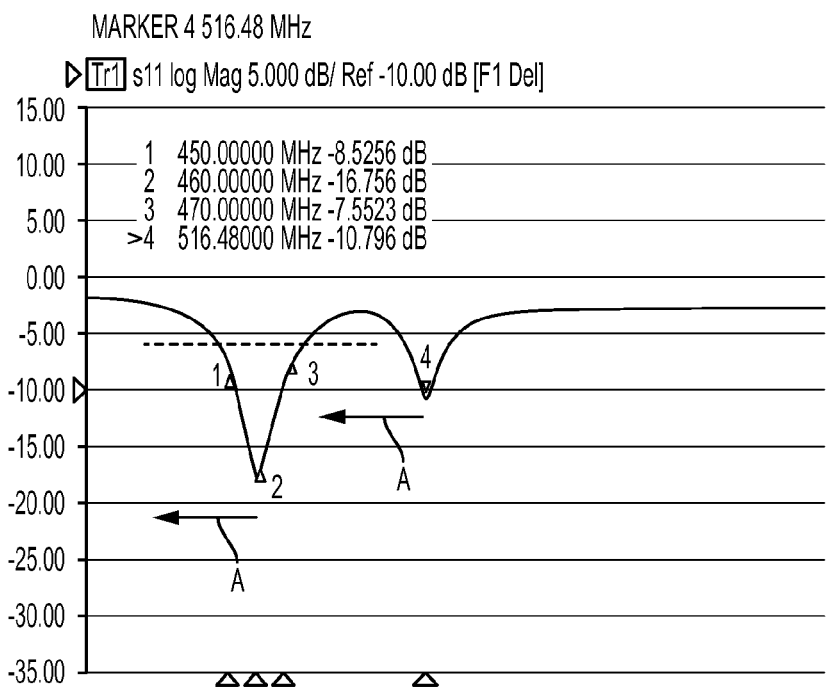
FIG. 7 is a graph illustrating the shift in the resonances of the multiple resonance antenna when the antenna is surrounded by water.
Figure 8:
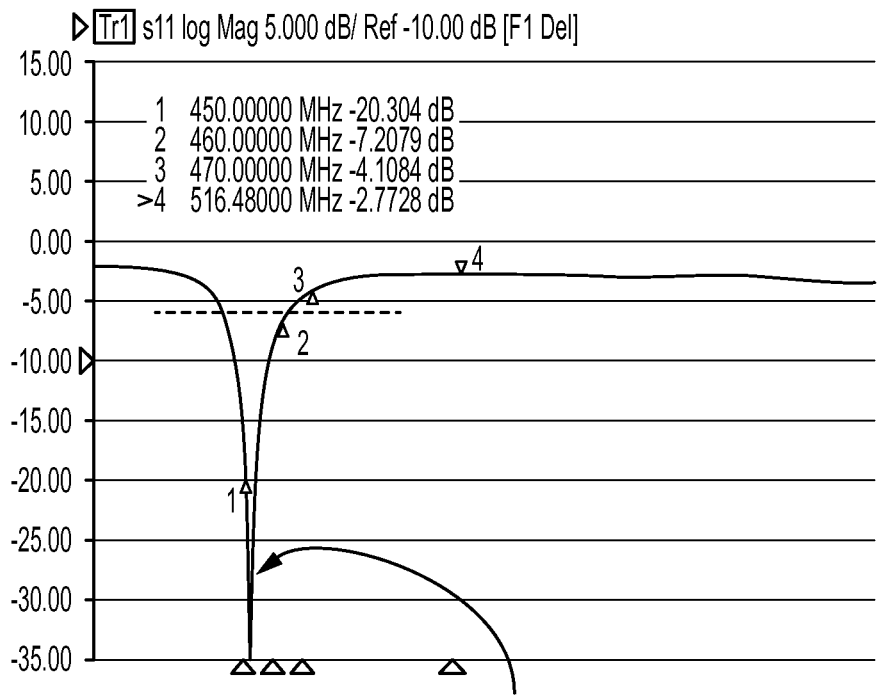
FIG. 8 is a graph illustrating that the out-of-band resonance replaces the in-band resonance when the antenna is surrounded by water.

With reference to FIGS. 6-8 and continuing reference to FIGS. 1-5, the multiple resonance antenna 36 is configured to resonate at at least a first frequency band and a second frequency band such that a signal representing at least one of the volume of flow and the flow rate is transmitted to a remote unit within the first frequency band when the utility meter 10 is surrounded by a first medium, such as air or another gas, and the signal representing at least one of the volume of flow and the flow rate is transmitted to the remote unit within the second frequency band when the utility meter 10 is surrounded by a second medium, such as water 40. The first frequency band may be A1-A2 MHz and the second frequency band may be B1-B2 MHz, where A2>A1, B2>B1, and B1≥A2. More specifically, the first frequency band may be about 450-470 MHz and the second frequency band may be about 500-520 MHz. Alternatively, the first frequency band may be less than 1 GHz and the second frequency band may be greater than 1 GHz.

While the multiple resonance antenna 36 has been described hereinabove as functioning properly when surrounded by a first medium and a second medium, this is not to be construed as limiting the present invention as the antenna 36 may be configured to function properly in three or more different mediums.

With specific reference to FIG. 6, the use of a multiple resonance antenna such as antenna 36 provides the ability to cover more than one band in a single antenna and, therefore, the ability to support one radio module that operates in multiple frequency modes. The multiple resonance antenna 36 is used as follows. First, one or more resonances of the antenna serves the system to operate at the desired frequency band (i.e., in-band operation frequency) while water 40 is not present within the pit 38 (i.e., a free space medium). For example, if the free space in-band frequency is 450-470 MHz, one or more resonances support this band. Second, another resonance is designated to operate at higher frequencies out-of-band of operation in a free space medium, for example, around 500-520 MHz.

This other resonance that is designed to operate at a higher frequency in free space, was carefully tuned, while the free space medium was changed and became filled with water 40, such that this resonance shifts due to the effect of the pit 38 becoming filled with water 40 and thereby takes place the in-band resonance. As a result, when the pit 38 becomes filled with water 40 the out-of-band resonance takes the place of the in-band resonance and the antenna 36 continues to function properly (i.e., the antenna 36 stays tuned to the desired frequency). Accordingly, as the pit 38 fills with water 40, both resonances shift lower as denoted by the arrows A in FIG. 7. As a result, the out-of-band resonance takes the place of the in-band resonance as shown in FIG. 8.

EXAMPLE

The following example provides a more detailed explanation of an exemplary multiple resonance antenna as used in conjunction with the utility meter 10 of the present invention and is not to be construed as limiting the invention.

When utilizing a multiple resonance antenna in accordance with the present invention, a first determination that must be made is path loss. The path loss is the total loss of a channel due to signal fading, diffraction, and/or reflection. The path loss determines the communication distance by considering the following general equation in a free space and line of sight condition scenario:

Tx+Rx−PL=minimum signal power required at the input of the receiver.

where:
Tx=Transmission power generally measured in dBm;
Rx=Receiver sensitivity generally measured in dBm; and
PL=Path Loss generally measured in dB.

In order to receive a stable and reliable signal, the sum of the Tx+Rx should be greater than the PL.

As noted hereinabove, one of the most difficult installations for a utility meter 10 of an AMR assembly is inside a pit 38 as shown in FIG. 4. Some of the reasons that such an installation causes a degradation in the link quality is as follows. First, the utility meter 10 is surrounded by lossy material such as soil, because EM (electromagnetic wave) signals that propagate through such a material fade and lose their energy. In addition, some pits 38 are made from conductive materials that cause reflections on the antenna radiation pattern and on the signal propagation. A third problem occurs when the pit 38 becomes filled with water 40.

In general, when a wireless network is established, one of the key parameters to start the communication between the devices in the network is to keep the same frequency of operation. This means that for a device in the system to work at the same frequency, every radio included in the system must be tuned on the same frequency. In addition, to receive and transmit RF signals, an antenna component must be connected to the transceiver and the antenna must also be tuned to the same frequency as the radios are tuned.

In general, the length of the antenna determines the frequency at which it operates. The frequency of an antenna can be easily calculated by the following equation when the antenna is in a free space medium (i.e., air): $f=c/\lambda$, where $f$ indicates the frequency of operation; $c$ indicates the speed of light; and $\lambda$ indicates the wavelength. Accordingly, the frequency is defined by the wavelength. Acceptable wavelengths for antennas are ¼ wavelength, ½ wavelength, or ⅝ wavelength, for instance.

When a pit 38 becomes filled with water 40, this has an immediate effect on the antenna tuning. The antenna acts as a transducer between the characteristic impedance of a radio system, which is generally 50Ω, to the impedance of free space, which is defined by $Z0=\sqrt{(\mu 0/\in 0)}=377\Omega$.

$\mu 0$ and $\in 0$ are the vacuum permeability ($4\pi \times 10^{-7}$ H m$^{-1}$) and vacuum permittivity ($8.85418782 \times 10^{-12}$ m$^{-3}$ kg$^{-1}$ s$^4$ A$^2$), respectively, of air. It is necessary that the antenna impedance match to the entire frequency of operation. An indication of antenna matching is characterized by return loss (RL) or voltage standing wave ratio (VSWR), which are two measurements of antenna impedance data.

Both RL and VSWR measure how much of the power delivered to the antenna is reflected back from the antenna. It is desired that all the power transferred to the antenna will be radiated back into space with no reflection; however, in reality, some amount of energy will always be reflected back. FIG. 8 illustrates a typical return loss measurement. The horizontal axis indicates the frequency range and the vertical axis indicates the return loss level.

As noted hereinabove, an antenna is typically tuned to operate in a certain frequency and for a given medium. The common medium is air which is the dominant medium around us. However, an antenna can be tuned for any other medium, such as water, concrete, wood, human tissue, etc. Different mediums with different values of the dielectric constant ($\in r$) directly effect the wavelength inside the material and also on the resonance frequency by the following formula:

$$f \approx c/(\lambda * \sqrt{\in r}) \text{ or } \lambda \approx c/(f * \sqrt{\in r}).$$

From this equation, it is apparent that the wavelength of an EM wave is different inside materials with different dielectric constants. Therefore, if an antenna with a given dimension that matches to operate in free space ($\in r=1$) were to be positioned within a medium having a higher dielectric constant, for example, water ($\in r \approx 78$), the antenna frequency of operation would shift to fit the proportion between the speeds of light to the wavelength in a given medium. Accordingly, when positioning such an antenna in a medium such as water, the antenna frequency of operation shifts toward a lower band. In this situation, the antenna is no longer matched to the frequency of the system operation, and most of the transferred power to the antenna is reflected. The results are communication link quality degradation and system coverage reduction. However, by using a multiple resonance antenna in accordance with the present invention, the out-of-band resonance of the multiple resonance antenna can be utilized to maintain the communication link.

Figure 9:
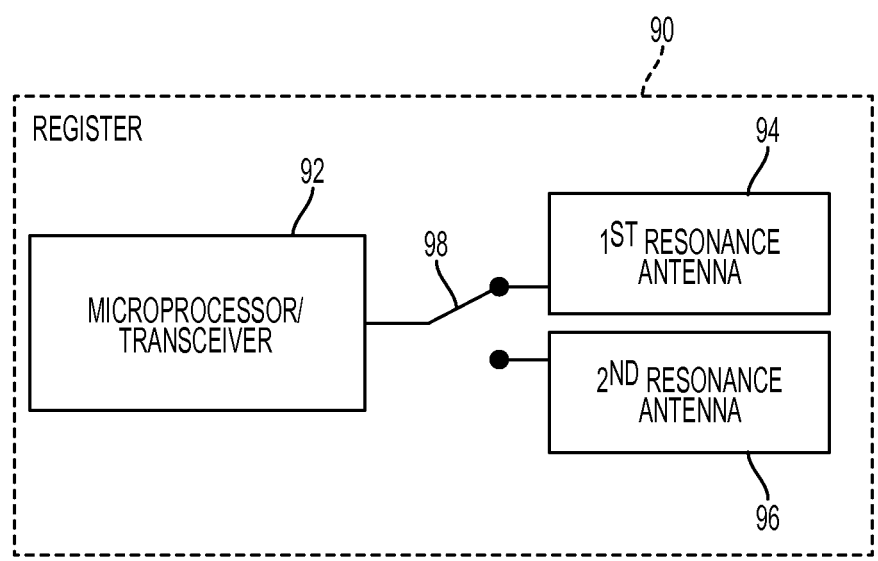
FIG. 9 is a block diagram of a register of an alternative embodiment of the utility meter in accordance with the present invention.

With reference to FIG. 9, an alternative embodiment of a register 90 may replace the multiple resonance antenna 36 with two antennas having switching capabilities. More specifically, the register 90 includes a microprocessor having a transceiver 92 that is configured to determine the number of rotations of the measuring chamber 14 and the direction of rotation, a first antenna 94 functioning at a first resonance, a second antenna 96 functioning at a second resonance, and a switching element 98. Alternatively, the switching element 98 may be eliminated and the antennas 94 and 96 may be directly connected to the transceiver such that both antennas are continuously transmitting.

In operation, when the register 90 is surrounded by a first medium, such as air, the first antenna 94 is utilized to transmit a signal representing at least one of the volume of flow and the flow rate is transmitted to a remote unit within the first frequency band. On the other hand, when the register 90 is surrounded by a second medium, such as water, the switching element 98 switches to the second antenna 96 to transmit a signal representing at least one of the volume of flow and the flow rate is transmitted to a remote unit within the second frequency band.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A utility meter, comprising:
   a meter body having a chamber through which material passes;
   a measuring unit contained within the chamber; and
   a register attached to the chamber, the register comprising a register body; an electronics unit operatively connected to the measuring unit and positioned within the register body, the electronics unit coacts with the measuring unit to determine at least one of a volume of flow and a flow rate of a fluid traveling through the chamber; and a multiple resonance antenna operatively connected to the electronics unit;
   wherein the multiple resonance antenna is configured to resonate at least at a first frequency band and a second frequency band such that a signal representing at least one of the volume of flow and the flow rate is transmitted to a remote location within the first frequency band when an exterior of the utility meter is surrounded by a first medium and the signal representing at least one of the volume of flow and the flow rate is transmitted to the remote location within the second frequency band when the exterior of the utility meter is surrounded by at least a second medium; and
   wherein the register transmits the signal representing at least one of the volume of flow and the flow rate periodically or nonperiodically via the multiple resonance antenna, thereby identifying utility consumption.

2. The utility meter of claim 1, wherein the register further comprises a face cap and a space between the cap and the antenna is filled with a medium.

3. The utility meter of claim 2, wherein the medium is at least one of gas and gel.

4. The utility meter of claim 1, wherein the measuring unit is one of a positive-displacement type measuring unit, vane-type measuring unit, an ultrasonic measuring unit, and multi jet type measuring unit.

5. The utility meter of claim 1, wherein the first frequency band is A1-A2 MHz and the second frequency band is B1-B2 MHz, where A2>A1, B2>B1, and B1≥A2.

6. The utility meter of claim 1, wherein the first frequency band is about 450-470 MHz and the second frequency band is about 500-520 MHz.

7. The utility meter of claim 1, wherein the first frequency band is less than 1 GHz and the second frequency band is greater than 1 GHz.

8. The utility meter of claim 1, wherein the first medium is gas and the second medium is water.

9. The utility meter of claim 1, wherein the utility meter is connected to a pipe positioned within a subsurface pit enclosure.

10. The utility meter of claim 1, wherein the register body comprises an upper face portion and a lower portion defining an internal cavity when connected together.

11. The utility meter of claim 10, wherein the electronics unit comprises a visual display that is visible through the face portion of the register body.

12. The utility meter of claim 11, wherein the visual display displays at least one of the volume of flow and the flow rate of the fluid traveling through the chamber as measured by the register.

13. The utility meter of claim 1, wherein the meter body and the register are formed as a unitary structure.

14. The utility meter of claim 1, wherein the electronics unit of the register further comprises a microprocessor having a transceiver operatively connected to the multiple resonance antenna.

15. A meter register, comprising:
    a register body;
    an electronics unit operatively connected to a measuring unit of a utility meter and positioned within the register body, the electronics unit coacts with the measuring unit to determine at least one of a volume of flow and a flow rate of a fluid traveling through the utility meter; and
    a multiple resonance antenna operatively connected to the electronics unit and positioned within the register;
    wherein the multiple resonance antenna is configured to resonate at least at a first frequency band and a second frequency band such that a signal representing at least one of the volume of flow and the flow rate is transmitted to a remote location within the first frequency band when an exterior of the utility meter is surrounded by a first medium and the signal representing at least one of the volume of flow and the flow rate is transmitted to the remote location within the second frequency band when the exterior of the utility meter is surrounded by at least a second medium; and
    wherein the register transmits the signal representing at least one of the volume of flow and the flow rate periodically or nonperiodically via the multiple resonance antenna, thereby identifying utility consumption.

16. The meter register of claim 15, wherein the register body is configured to be attached to a chamber of the utility meter.

17. The meter register of claim 15, wherein the first frequency band is A1-A2 MHz and the second frequency band is B1-B2 MHz, where A2>A1, B2>B1, and B1≥A2.

18. The meter register of claim 15, wherein the first frequency band is about 450-470 MHz and the second frequency band is about 500-520 MHz.

19. The meter register of claim 15, wherein the first medium is gas and the second medium is water.

20. The meter register of claim 15, wherein the utility meter is connected to a pipe positioned within a subsurface pit enclosure.

21. The meter register of claim 15, wherein the register body comprises an upper face portion and a lower portion defining an internal cavity when connected together.

22. The meter register of claim 21, wherein the electronics unit comprises a visual display that is visible through the face portion of the register body.

23. The meter register of claim 22, wherein the visual display displays at least one of the volume of flow and the flow rate of the fluid traveling through the chamber as measured by the register.

24. The meter register of claim 15, wherein the electronics unit comprises a microprocessor operatively connected to the multiple resonance antenna.

25. The meter register of claim 15, wherein the signal representing at least one of the volume of flow and the flow rate is transmitted periodically or nonperiodically via the multiple resonance antenna, thereby identifying utility consumption.

26. An antenna for use with a utility meter, comprising:
a first resonance element and a second resonance element formed on a flexible substrate,
wherein the first resonance element is configured to resonate at least at a first frequency band and the second resonance element is configured to resonate at least at a second frequency band such that a signal representing at least one of the volume of flow and the flow rate is transmitted to a remote location within the first frequency band when an exterior of the utility meter is surrounded by a first medium and the signal representing at least one of the volume of flow and the flow rate is transmitted to the remote location within the second frequency band when the exterior of the utility meter is surrounded by at least a second medium; and
wherein the register transmits the signal representing at least one of the volume of flow and the flow rate periodically or nonperiodically via the multiple resonance antenna, thereby identifying utility consumption.

27. A utility meter, comprising:
a meter body having a chamber through which material passes;
a measuring unit contained within the chamber; and
a register attached to the chamber, the register comprising a register body; an electronics unit operatively connected to the measuring unit and positioned within the register body, the electronics unit coacts with the measuring unit to determine at least one of a volume of flow and a flow rate of a fluid traveling through the chamber; a first antenna operatively connected to the electronics unit and positioned within the register; a second antenna operatively connected to the electronics unit and positioned within the register; and a switching element operatively connected between the electronics unit and the first antenna and second antenna;
wherein the first antenna is configured to resonate at least at a first frequency band and the second antenna is configured to resonate at least at a second frequency band such that a signal representing at least one of the volume of flow and the flow rate is transmitted to a remote location within the first frequency band when an exterior of the utility meter is surrounded by a first medium and the signal representing at least one of the volume of flow and the flow rate is transmitted to the remote location within the second frequency band when the exterior of the utility meter is surrounded by at least a second medium; and
wherein the register transmits the signal representing at least one of the volume of flow and the flow rate periodically or nonperiodically via the multiple resonance antenna, thereby identifying utility consumption.

* * * * *